United States Patent [19]
Kunert

[11] Patent Number: 5,533,314
[45] Date of Patent: Jul. 9, 1996

[54] FRAMELESS INSULATING GLAZING UNIT AND A METHOD FOR THE PRODUCTION THEREOF

[76] Inventor: Heinz Kunert, Am Krieler Dom 23, 50935 Köln, Germany

[21] Appl. No.: 302,790

[22] PCT Filed: Jan. 11, 1994

[86] PCT No.: PCT/EP94/00069

§ 371 Date: Sep. 12, 1994

§ 102(e) Date: Sep. 12, 1994

[87] PCT Pub. No.: WO94/16187

PCT Pub. Date: Jul. 21, 1994

[30] Foreign Application Priority Data

Jan. 11, 1993 [DE] Germany ............ 43 00 481.4

[51] Int. Cl.⁶ .................................................. E04C 2/54
[52] U.S. Cl. .................. 52/788.1; 52/790.1; 156/109
[58] Field of Search .................. 52/788, 790; 156/99, 156/102, 109

[56] References Cited

U.S. PATENT DOCUMENTS

| | | | |
|---|---|---|---|
| 4,831,799 | 5/1989 | Glover et al. | 52/790 X |
| 5,007,217 | 4/1991 | Glover et al. | 52/790 X |
| 5,079,054 | 1/1992 | Davies | 52/790 X |
| 5,087,489 | 2/1992 | Lingemann | 52/790 X |
| 5,139,850 | 8/1992 | Clarke et al. | 52/790 X |

*Primary Examiner*—Carl D. Friedman
*Assistant Examiner*—W. Glenn Edwards
*Attorney, Agent, or Firm*—Sixbey, Friedman, Leedom & Ferguson; Gerald J. Ferguson, Jr.; Tim L. Brackett, Jr.

[57] ABSTRACT

The insulating glazing unit in accordance with the invention consists in its simplest form of two panes 1 and 2 which are joined together by means of a shaped body 13 constituted by a textile spacer fabric. By means of its high elasticity, flexurally rigid rib fibers 16 the textile spacer fabric renders possible a force transmitting coupling of the panes and the formation of a dimensionally stable and self-supporting sheet body. This sheet body is suitable in particular for the production of frameless window lights.

41 Claims, 3 Drawing Sheets

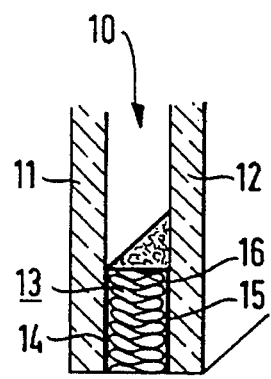
Fig. 1
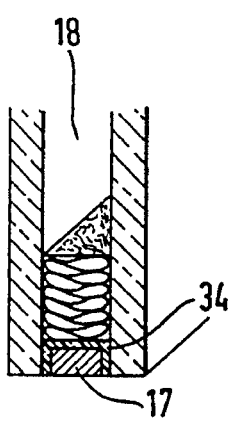
Fig. 2
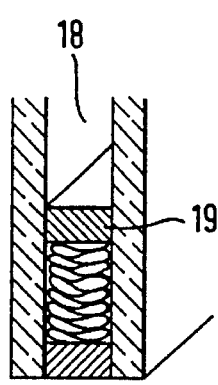
Fig. 3
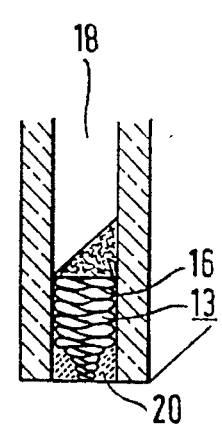
Fig. 4
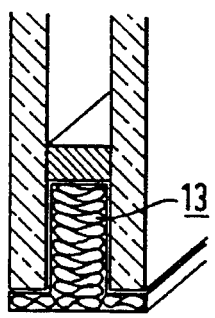
Fig. 5
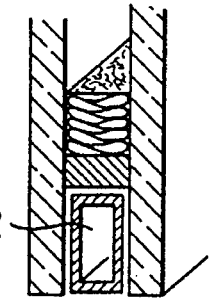
Fig. 6
Fig. 7
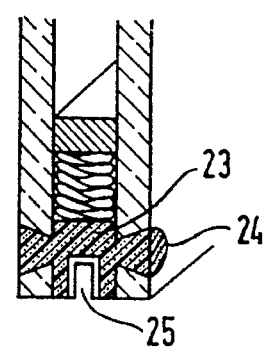
Fig. 8
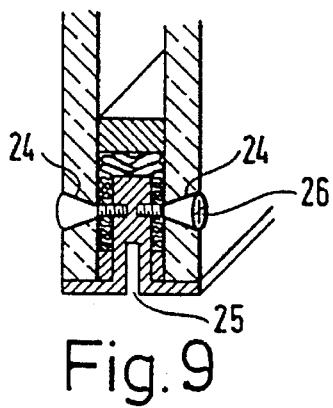
Fig. 9
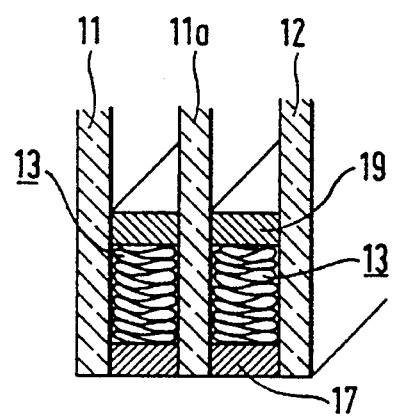
Fig. 10
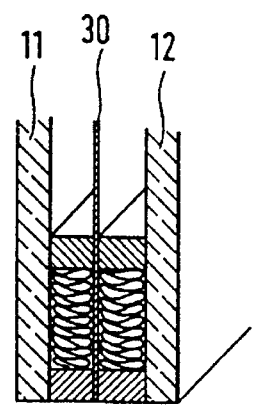
Fig. 11

FRAMELESS INSULATING GLAZING UNIT AND A METHOD FOR THE PRODUCTION THEREOF

The invention relates to a frameless insulating glazing unit comprising at least two panes arranged in parallelism to each other and connected together by a marginally surrounding spacer and to a method for the production thereof.

For a very long time the glazing elements of window lights (i.e. the movable parts of windows) have always been designed with frames containing them and endowing the glass panes with rigidity as a sheet and furthermore protecting the edge of the fragile glass material. The window framing means consisting of wood, plastic or aluminum mouldings serve more particularly to receive the functional fittings and owing to their stiffness and special cross section render possible a reliable sealing action against the outer stationary frame let into the masonry.

A departure from this traditional system to have a frameless window light glazing system leads to a substantial gain of transparent area although the windows still occupy the same proportion of the wall. Dependent on the width of the window light frame it is possible, but not having the opaque supporting frame, a gain in the free area available for the passage of light and solar radiation of 20% to 40%.

A particular advantage for building practice is to be seen in the rational nature of frameless window glazing units. In this respect one may simply call to mind the need for materials such as wood, plastic and aluminum for the production of window light frames, the attention they require, and furthermore their limited resistance to aging and last but not least recycling problems in connection therewith. In this respect it is furthermore to be taken into account that every increase in frame size necessitates additional measures in order to comply with the requirements as regards the frame. For instance for aluminum sash frames, which have an area above approximately 1 square meter, steel reinforcement is required.

Since furthermore at present with state of the art insulating glass technology the thermal insulating coefficients of the pane elements are better than those of the frame system, the supporting frame as a rule leads to a global increase in the transition of heat through the window light.

Designs of frameless window lights suitable for use of the type in which the glass element without a frame constitutes the window light, have, despite the above mentioned advantages, not found application in building practice so far. An explanation for this is to be seen in the fact that in the case of windows it is a question of components of the surface surrounding the building, which are affected by winds and other effects of the weather and consequently to this extent require a high quality sealing and closing system, which so far has only been assured by a flexurally rigid frame design bearing the pane element.

A further inconvenient factor is that at the present time frameless designs have to be on the basis of double-pane insulating glass windows, since insulating panes have become the standard for window glazing systems in building practice.

Insulating glazing units are characterized by their double pane structure. The two glass panes, each with a thickness of 3 to 6 mm dependent on the size of the area, enclose an intermediate space, filled with air or a rare gas, having a width of 12 to 16 mm which is set and sealed off at the surrounding edge of the panes with a hollow aluminum rib or using a suitable rib of an elastic or plastic synthetic resin material.

The rib defining the distance has a double function: On the one hand it serves as an adhesive bond for mechanically connecting the panes together and on the other hand it seals off the intermediate space between the panes in a diffusion-proof fashion.

An adhesive bond, even if produced using a dimensionally stiff intermediate rib, is however not suitable for stiffening the panes to give a mechanically rigid, self-supporting pane or sheet member. Owing to the weight of the panes as such it is unable to withstand the shear forces. Even for this reason such a pane unit must be mounted in a supporting frame structure, in which in order to avoid a displacement of the individual panes in relation to each other the element must be secured in position in the groove of the frame bars using lugs. The mounting of the pane element in the glass groove requires, as is known, elaborate measures for fixing, for sealing and for the removal of condensed water.

The pane element itself does not have any supporting function. It lacks a sufficiently rigid, force transmitting attachment of the panes to one another. In order to mount the pane element directly, i. e. without a supporting sash frame, on the outer stationary frame, it is more particularly necessary to provide a force transmitting integration of the supporting and locking bands.

Insulating glazing units composed to two force transmittingly coupled panes have been described in an article by F. B. Grimm entitled "Glas als tragender Baustoff: Glassandwich-Elemente" in glas+rahmen (1991) 19, pages 1020 through 1028. The force transmitting coupling between the two insulating panes was achieved either by mechanically connected spacers or by spacers bonded to resist thrusts. In the first case pins welded on the panes fit into holes provided in the spacers. As an alternative it is possible for the panes to be connected together by means of counter-sunk head screws, which extend through exactly fitting holes and are attached in suitable threaded holes in the spacers.

In the second instance the spacers have a receiving space for a silicone adhesive, the spacer completely encircling the adhesive and consequently preventing change in form under a thrust load. As a third possibility a sandwich core is proposed composed of two sheet parts able to be plugged together and which is bonded over the entire surface to the two panes.

A force transmitting attachment in the edge part may therefore be produced in a simple fashion even by having space-setting screw or rivet means between the pair of panes using drilled holes with an accurate fit. Drilled holes however, more especially in the edge zone, always imply some sort of impairment of the integrity of a brittle pane member. A flexurally rigid reinforcement of the edge zone along a substantial length is then not to be attained without having additional support parts and load resisting edge reinforcements owing to the occurrence of local strain peaks.

Furthermore a flexurally rigid reinforcement using a solid shaped body, as for instance of wood, plastic or metal, does not lead to the desired solution to the problem. The loads caused by thermal effects or by flexing are responsible for tensile strains along the length, which, transmitted to the panes, may cause fracture of the panes because they open up notches or hair cracks present in the panes.

By the same token rigidly bonded spacer blocks are to be avoided as far as possible, since they lead in a discontinuous fashion to local strain loads on the pane surface and more especially in the case of jerky acting forces lead to so-called strain cells, which are not able to be resisted by glass panes.

Furthermore a more elastic or plastic bonding of solid spacer bars or spacer blocks can not lead to a solution to the problem, more especially if it has to also perform the function of a diffusion-proof sealing of the intermediate space between the panes. In the case of vertically arranged insulating glass elements such a bonded seam joint is not only subject to weight-occasioned shear forces, which are parallel to the panes, but furthermore to bending moments constantly being caused by wind loads and by a thermal bulging effect tangent to the edge of the pane.

Moreover the above mentioned connection techniques are unsuitable for adapting the transition of heat in the peripheral parts of frameless insulating glazing units to the values of the pane element while not reducing the passage of light therethrough.

The invention has for the first time provided an insulating glazing element in the case of which the panes are force transmittingly coupled together while avoiding deleterious and more particularly local strains and loads and are hence suitable as a frameless glazing element without a reduction in strength, in which respect furthermore the thermal quality and transparency to light are substantially increased to be greater than in the case of a framed glazing element.

In accordance with the invention an insulating glazing unit is provided having at least two panes arranged in parallelism to each other, which are connected together by a spacer, extending around the edge and which is characterized in that the spacer is constituted by a shaped member which possesses a plurality of elastic, flexurally rigid and mutually intersecting filaments, which extend perpendicularly in relation to the planes of the panes and constitute a force transmitting buttressing or strut means between the panes.

An important aspect of the invention is the conversion of an insulating glass pane into a dimensionally stable, flexurally rigid and self-supporting sheet or pane element, which is suitable to assume the conventional functions of a window light without being incorporated in a stiffening, sealing wood, synthetic resin or aluminum sash frame mounting the mechanically acting fittings.

In this respect a significant concept of the invention is to separate the function of the laterally surrounding sealing or closure means for the intermediate space between the panes and diffusion-proof sealing thereof from the function of ensuring proper mechanical connection of the parts and the structural strength of the glazing element and to perform the latter functions by a mechanically stiff and force transmitting reinforcement of the pane around the edge thereof, the loads taking place being distributed by the elastic filaments evenly and without any local strain over the edge strips of the panes. Despite the elasticity thereof the filaments constitute a rigid, thrust resisting connection between the panes, since, intersecting each other, they constitute a dimensionally rigid buttressing means owing to the triangulation effect.

Such a glass pane body does not require any additional supporting frame means for stabilizing or strengthening it. Owing to the peripheral area parts being rigidly connected together in a force transmitting fashion the statics thereof are such as to excel those of any mounted, supporting frame means. Owing to the high modulus of elasticity of glass, loads are taken up by the entire area of the panes and not just by the pane edge portions which are connected together in a force transmitting manner.

For the technical details of a marginally surrounding, force transmitting and rigid coupling arrangement between two panes, two matters are important for consideration. On the one hand it is the multiplicity of the loads, which have to be resisted by the edge connection means or, respectively, the surrounding frame structure arranged between the panes, that is to say, as above mentioned, shear strains due to the weight loading by the individual panes, which, following the center of gravity of the panes on opening a laterally hung window light, do not only take effect in one single direction. Added to this there are the bend-pull and bend-compression loads, which act owing to the alternating bulging inwards and outwards owing to thermal changes in volume of the enclosed gaseous medium, on the edge reinforcement. Furthermore there are alternating, impact-like bend-pull and bend-compression loads, as well as tensile and compressive loads due to the pressure and suction effects of the wind. Finally there are, in a similar fashion, loads due to manually opening and closing of the window light.

On the other hand in the case of marginally surrounding, force transmitting coupling techniques the structural properties of the pane material to be connected must be taken into account. Glass is a brittle, highly elastic material, with an inherently higher modulus of elasticity than steel. Its compressive strength with values of approximately 800 N/mm$^2$ is substantial. But on the contrary its (practically permitted) tensile strength is however merely approximately 80 N/mm$^2$ owing to microcracks and microinclusions at the surface of glass, which are more especially to be encountered in the edge zone after cutting.

The familiar, proverbial fragility of glass sheet is mostly due to the opening up of such microcracks by reduction in the tensile strains at the surfaces as a consequence of bending loads or however owing to locally occurring tensile strain peaks. Owing to the flat or area-wise application of pressure coatings on the surface of glass sheets it is possible to increase the resistance to fracture of the sheet. Then higher tensile forces are required to open the microcracks, that is to say for causing fracture of the pane.

In the case of toughened glass sheets which have a resistance to bending fracture increased by a factor of 3 to 4, heating of the glass followed by a rapid cooling leads to tensile forces in the core of the glass, whereas at the surfaces on the contrary compressive strains are built up. As an analogy to this principle load bearing concrete layers are reinforced in the middle with steel wire.

For providing a force transmitting, marginally surrounding coupling means between the panes of an insulating glass element there is therefore in accordance with the invention the provision of a dimensionally stable band body, which while having an extremely low material density possesses a high structural elastic rigidity, which band body may firstly transmit the thrust forces resulting from flexure of the panes by way of compensation to the other pane element, which secondly is able to take up the shear forces occurring on the contact areas with the panes in all directions in a damping manner with a transfer of the forces which is as even as possible, and which thirdly is able to resist the compressive and tensile loads acting on the composite pane. Added to this there is fourthly the ability of such a shaped body laid between the panes to develop inherent tensile strains.

Finally in the case of this shaped body the invention provides transparency or translucency to light together with the ability to maintain thermal insulation values hardly departing from those of the insulating glass element.

In the case of shaped bodies, which are able to meet these requirements and possess such qualities, it is not possible to have solids with a material substance. In fact it is necessary to use structural configurations, i. e. shaped bodies which are composed of a multiplicity of thin, flexurally rigid and highly elastic buttressing elements able to be loaded in all directions.

In accordance with the invention there is the proposal to utilize inherently known textile spacer fabrics. Those fabrics composed of glass, synthetic resin or carbon fibers or fabrics consisting of blends of such materials to meet specific requirements, are conventionally made up of two fabric layers, which are joined together by fibers running perpendicularly or at an angle thereto. These rib fibers, which dependent on requirements may be differently arranged, hold the two layers of fabric spaced apart like a framework. The rib fibers in this case constitute, in the form of a mesh or loop structure, rows of ribs arranged essentially perpendicularly to the covering layers, the covering layers being able in addition to be connected together again by fiber structures extending diagonally to the rows of ribs. Such spacer fabrics have so far more particularly been employed as spacer coatings for the production of various types of composite fiber materials.

Spacer fabrics are as a rule impregnated with resin when they are processed. The impregnation with resin may take place both by dipping in the resin composition or furthermore by even application on the fabric. The excess resin is then expressed between films or rolls. After the impregnation with resins the rib fibers will return to the original level automatically without an adjuvant and render possible, owing to the definable length thereof, distances from the covering layers, which can be set as desired. The arrangement and level of the fibers determine the strength of the sandwich structure resulting after curing of the resin sizes. In an advantageous fashion a substantial proportion of the intersecting rib fibers are connected with each other at the points of intersection after curing of the resin.

For the marginally stiffened and force transmitting connection of the frameless window light insulating glazing units spacer fabrics of glass filament fibers are to be preferably utilized owing to their high modulus of elasticity and their good light transmission, which—provided with silane sizes—have a satisfactory adhesive capacity for cross-linking with a wide selection of resins such as epoxy, polyurethane, phenol and polyester resins.

In accordance with an advantageous and simple method of proceeding the invention contemplates a system in which a resin impregnated spacer fabric with a width of 20 to 30 mm, or in the case of larger areas, 40 to 50 mm is laid around on the edge of the panes. After accurate positioning of the second pane the resulting laminate is firstly pressed together in a press mold so that the glass panes are marginally adhesively bonded together on the covering layers of the fabric.

In the course of curing of the resin the rib fibers positioned perpendicularly to the covering layers of the glass fiber fabric erect themselves owing to their restoring forces. This operation may in an advantageous fashion be aided by a graduated or predetermined opening of the press mold in order to control and set the distance apart of the plane-parallel glass panes, as for example using a suction effect, the glass panes, while adhering to the press platens, being drawn away from each other. Owing to the resin casing and after the curing of the same the rib fibers form a dimensionally stable, extremely flexurally rigid supporting structure. Having regard to the high modulus of elasticity of the glass fibers it is possible for this supporting structure, as initially explained as an object of the invention in detail, to resist and transmit both high thrust forces and furthermore resist high compressive and tensile loads. The result is consequently, owing to the surrounding edging means of two or multilayer insulating glazing units with such glass fiber spacer fabrics, dimensionally stable, torsionally rigid self-supporting sheet members.

A particular advantage of the use of textile spacer fabrics of this type is the translucence of such stiffening spacer fabrics and at the same time their thermal insulation coefficient adapted to the insulating body. Both the translucence and the thermal insulation coefficient can be increased by specially designing the rib fibers.

Thus the invention furthermore contemplates an arrangement in which the glass fibers are provided with resin sizes of graduated density in a fashion similar to optical guide fibers in order to give a suitable coupling of the rib fibers to obtain low-loss optical guide effects owing to the resin layer of the covering layers.

As regards increasing the thermal insulating coefficients, it is possible to reduce the heat transition due to heat conduction by having thinner rib material, and to reduce heat transition owing to convection by a greater density of such thin fiber material and with it an accompanying reduction in the movement of gas in the intermediate space between the panes.

It is a further advantage to fully or at least partly provide the glass, synthetic resin or carbon fibers employed for the production of the textile spacer fabrics as hollow fibers. This will reduce the heat transition through the shaped body still further. Moreover, optical guide effects can be obtained or are at least favored by the use of hollow fibers even without additional sizes. The employment of hollow fibers further leads to a higher rigidity and elasticity of the spacer fabric. This facilitates the erection of the rib fibers or their automatic return to an upright position after the impregnation.

Furthermore an arrangement of marginally surrounding sealing ribs is preferred which is to the outside of the spacer fabric. The freeing of these sealing ribs arranged between the panes from a mechanical function of stably holding the insulating glazing unit is an advantage for the working life of insulating glazing units. Owing to the force transmitting and interlocking reinforcement of the edge areas of the insulating glazing unit by the shaped bodies it is hardly possible for forces, due to bulging as caused by wind loads and atmospheric effects and coming from the center area of the pane, to affect the edge sealing ribs. For this reason the designer is in a position to utilize sealing material which is preferentially adapted for the functions of diffusion sealing and ensuring a low transition of heat.

Further advantageous developments and convenient forms of the invention will be understood from the following descriptive disclosure of various embodiments in conjunction with the accompanying drawings.

FIG. 1 shows an insulating glazing unit in accordance with the invention in cross section.

FIG. 2 to FIG. 14a respectively show further embodiments of the invention in cross section.

Figure 12:
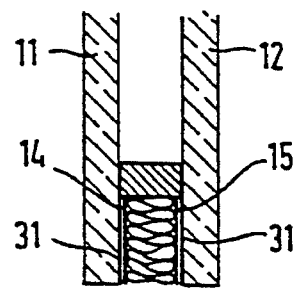

In the case of the embodiment depicted in FIG. 1 the insulating glazing unit 10 consists of two transparent panes or sheets 11 and 12, more particularly glass panes, arranged with a distance between them. The two panes are connected in a force transmitting fashion at their edges by means of a surrounding textile spacer fabric 13. The spacer fabric possesses two covering layers 14 and 15, which respectively comprise the respective fibers, which are made into a fabric by weaving or knitting, and extend in parallelism to the pane surfaces. The covering layers are connected together by means of a resin coating (not illustrated) with the panes 11 and 12 and by means of filaments or rib fibers 16 extending transversely in relation to the panes. The rib fibers intersect one another and may be partly or completely surrounded by a resin coating. Owing to such resin casing the rib fibers are joined together as stiff and flexurally rigid struts, which have a high modulus of elasticity. In the cured condition the resin impregnated textile spacer fabric 13 hence constitutes a shaped body, which is characterized by a highly elastic structure which is able to be loaded in all directions. In combination with the two panes 11 and 12, if the shaped body 13 is arranged to extending around the edge, a dimensionally stable, torsionally stiff and self-supporting sheet member is obtained.

In the illustrated working embodiment of the invention of FIG. 2 there is additionally a sealing rib 17 for providing a diffusion-proof sealing effect for the intermediate space 18 between the panes. In an advantageous fashion, in the case of the insulating glazing unit in accordance with the invention, for sealing no highly elastic sealing materials are required in order to take up the deforming forces of the panes, and it is possible to utilize such sealing materials as possess optimum properties as regards diffusion density, thermal insulation and adhesion to the glass.

Thus it is to be recommended to cover the sealing rib 17 on the side which is facing or turned away from the interior space, including both side flanks in halves with a thin aluminum film 34, such film being permanently bonded by way of the surfaces laterally engaging the glass panes by means of a diffusion-proof adhesive to the glass panes. Preferably the middle film surface, which is perpendicular to the intermediate space between the glass panes, should be made with folds.

The intermediate space between the panes can be at least partly evacuated or filled with a thermally insulating material, preferably a gas or a rare gas. The sealing rib is preferably positioned on the outside in relation to the spacer fabric band or tape so that the cavity of the spacer fabric, belonging to the volume of the intermediate space between the glass, is able to be provided with the same gas filling. In order to secure the pane sealing effectively it is however possible furthermore to lay an additional sealing rib 19 inside the spacer fabric band in relation to the intermediate space 18 between the panes. Such a design is depicted in FIG. 3.

It is an advantage if the seal for the intermediate space 18 between the panes is produced by the fabric strip 13 itself using an arrangement of the rib fibers 16 with a density increasing towards the edge of the pane and by means of resin material 20 applied to the outside of the rib fibers including specially incorporated detergents. Such a measure, which is illustrated in FIG. 4, would also be an advantage as an additional seal. In connection with this the invention contemplates the manufacture of the spacer fabric material provided for edge stiffening of insulating glass panes with the required band widths, the bands or tapes being preferably manufactured with a greater supporting fiber density and/or denser longitudinally directed fiber structures at the edge.

Such bands may be preferably provided with resin sizes in a continuous process and be rapidly cured by the supply of energy, more particularly thermal energy and be prefabricated as ready to fit spacer rails or beads.

The rigid fabric structure rails are then cut to the required longitudinal sizes and thereafter laid between the panes around the edges so as to set the distance apart, and bondingly pressed with the panes. The bonding action can be performed by resin sizes fusing in the press.

In an advantageous fashion the bonding of the rails on either side may be performed by adhesive films applied to the spacer rails in the course of the manufacturing process. It is preferred for translucent, light scattering films to be utilized for this purpose for optically covering the inner structure of the rails. Furthermore color-toned, translucent film bands are possible which have a suitable artistic design.

As regards the prefabricated fabric structure rails there is a further proposal in accordance with the invention to manufacture such rails by suitable shaping tools in the form of a T-moulding. In the case of the embodiment illustrated in FIG. 5 the web of the T-like shaped body is arranged between the panes and the flanges of the T-like member overlap the outer edge of the panes. The surrounding covering of the glass edges by such a frame moulding contributes to edge stability and to securing the seal of the sheet body. The edge-surrounding arrangement of a spacer fabric 13 in the form of a T-moulding more particularly constitutes a good means of protecting the edge of the insulating glazing unit.

Such prefabricated fabric structure rails are suitably produced in a continuous process after the impregnation of the spacer fabrics and prior to their complete curing such that the partly cured spacer fabrics pass through a shaping tool. The spacer rails thus prefabricated may further be provided in one single operation with an adhesive coating on at least one covering layer and with an adhesive sealing rib on at least one of the side surfaces.

Conventional window constructions have opening mechanisms based on those employed for doors. The window light is hinged at one side edge using hinges on the outer front side of the decorative frame. In the case of this longitudinal hinge mounting, the word light implies such hinging to one side and owing to the inherent weight of the light in the manner of a lever arm and dependent on the length of the light in the upper part of the light element adjacent to the suspending mechanism of the element, there will be substantial tensile forces, but however furthermore compressive forces in the lower part.

In the case of the embodiment in accordance with FIG. 6 there is consequently an additional stiffening reinforcement for the lateral fabric band, for instance by means of a tubular member 21 integrated in the spacer fabric band 13, the tubular body being embedded at least in a part of the spacer fabric in a force transmitting fashion and extending in the longitudinal direction thereof.

In an advantageous fashion it is possible for the tubular body 21 to simultaneously serve as a pivot bearing for the suspending bands in such a manner that the tubular body along its length receives a round rod as a pivot pin, which may be rigidly secured, projecting past the ends of the tube, on fitting devices arranged in the outer stationary frame. The pivoting of the insulating glazing window light then occurs via the pin which is bearinged in the tubular body and hinged on the outer stationary frame. In just the same fashion the rod may be rigidly mounted in the tubular body and movingly bearinged in the outer stationary frame.

A structural stiffening of the pane element 10 in order to attach the pivot bands may as well, as shown in FIG. 7, be one using at least one flexurally rigid hollow moulding band 22, which like the tubular body 21 is arranged within the shaped body 13. Both for the stiffening integration of a tubular body 21 and also for that of a hollow moulding band 22, more particularly in the case of window lights hinged on one side, in view of the lever forces acting here, there should be an additional force transmitting coupling between the panes by the intermediary of a screw or rivet in accurately produced drilled holes. In the case of the embodiment of the invention illustrated in FIG. 8 the force transmitting coupling is ensured in a rational fashion by a viscous adhesive composition 23, which is thrust also into the undercut drilled holes 24 in the panes on either side. The suspending hinges 25 may also be embedded bondingly in the viscous adhesive composition 23. After curing of the adhesive composition 23 there will be distinctly force transmitting coupling of the panes 11 and 12.

The advantage of this manner of coupling of the panes using plastic bodies introduced while viscous and curing to a rigid state, with a high Shore hardness is to be seen more especially in the elasticity of such bodies and their accurate attachment to the wall surfaces of the drilled holes with the result that local or punctuate loads on the pane member adjacent to the drilled holes may be prevented without the otherwise conventional employment of protective sleeves and elastic separating washers.

In the illustrated working embodiment of the invention of FIG. 9 the support hinges 25 are attached using accurately arranged drilled holes 24 and countersunk head screws 26. In this case as well the screw connection achieves an additional force transmitting coupling of the panes 11 and 12.

For the insulating glazing unit in accordance with the invention owing to the above described interlocking and force transmitting and furthermore flexurally rigid attachment of the pane body, there is no particular problem in producing window light designs of this conservative type with window lights hinged or hung on laterally arranged bands. The force transmitting coupling of the two panes renders possible the assumption of loads, which go beyond the load capacity of customary frame designs.

It is more especially an advantage however to utilize frameless insulating glazing elements in the case of window designs with tilting or rotary lights, the frameless glass elements being pivoted about one of their center axes in the middle in the outer stationary frame. The load of the weight of the pane element is in this case transmitted via the pivot point to the outer stationary frame, which is integrated in the wall masonry, in a manner which is symmetrical around the axis. Owing to the hinging of the rotary light or member inside the outer stationary frame it is possible for the pane to be held in the neutral position by placing along the area on the groove of the lower strut of the outer stationary frame without internal strains.

The bearing or the pin element for the rotary fittings may preferably be integrated in the form of a flexurally rigid rail between the panes symmetrically in relation to the center axis of the panes into the spacer fabric transversely in relation to the longitudinal direction thereof in a force transmitting manner. Using holes provided accurately so as to be symmetrical in relation to the middle axis on both panes it is possible for the bearing element, as explained in connection with FIGS. 8 and 9 already, to be additionally connected with the sheet body by means of the adjacent rivets or screw, penetrating the pane surface.

The window light able to be rotated in the outer stationary frame is secured and sealed in the neutral position by means of a surrounding closure frame able to be moved forwards centrally out of the outer stationary frame. The moved forward closure frame then fits around the glass window light or it fits into a groove defined by the pane edges. In order to lock the planarly rigid glass sheet body to resist torsion, in the case of a surrounding closure frame even an advance of 3 to 5 mm is sufficient.

By having a louver-like design of the corner connections of the closure frame it is possible to achieve, for a design preventing advance, a sufficient closure between the glass pane light and the outer stationary frame, to keep out wind and beating rain, including the corner parts as well.

For the sake of simplicity it is possible for the seal furthermore to be provided by elastic sealing lips provided in the outer stationary frame or in the window light in a surrounding manner and for the mechanical locking action to be performed by an additional pin mechanism. The means receiving the pins fitting in from the outer stationary frame side are integrated at the edge in the spacer fabric where they are secured in a force transmitting fashion by means of the adhesive resins. As in the case of the rotary fittings with fittings of all types it is possible to provide additional attachment means using pinning and drilled holes on the adjacent panes.

Figure 15:
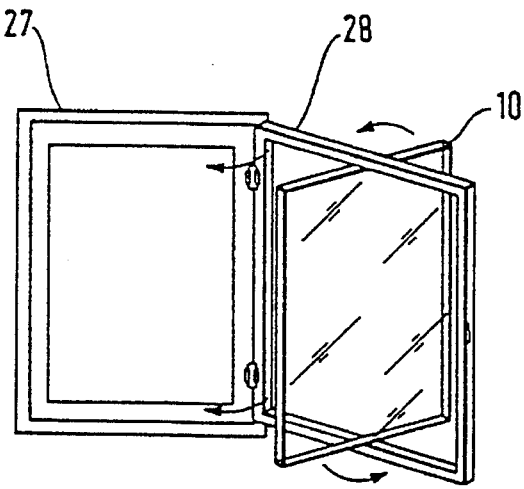
FIG. 15 is a diagrammatic perspective elevation of a rotary window in which the insulating glazing unit in accordance with the invention is employed.

As a further embodiment, which also renders possible a rotation or turning of the pane element in accordance with the invention about one of its middle axes, the arrangement illustrated in FIG. 15 is contemplated. The pane element 10 is in this case not integrated in the outer stationary frame 27 but rather with the pivotal mechanism in a folding window light 28 of conventional construction. In this case the outer stationary frame 27 is so designed that its abutment rails extend past the edge of the frameless pane element 10 surrounding the edge of the frameless pane element 10 on closing the window light. The pane element is then, on closing the window, thrust against a sealing moulding rail arranged on the inside of the upper edge of the abutment rail of the outer stationary frame, surrounding the edge.

In this type of window construction the above mentioned arrangement of the sealing and closing mechanisms in the covering light is dispensed with. The advantage of this construction is to be seen in the possibility of fitting such windows, independently of the possibility of rotating the glass area, as a tilting or turning window with customary forms of fitting, the mechanical fitting, as is conventional, being accommodated in the light frame.

More particularly the thermal quality of such windows is to be considered to be advantageous. The normally greater thermal transition in the edge parts in the case of insulating panes can be completely prevented here, since the edge portion of the frameless insulating glazing unit 10 rests against the outer stationary frame 27 on the room side.

A further advantageous feature to be noted is that an unframed insulating glazing unit only has to have two rotary bearing elements as for instance devices to be incorporated in the pane edge in the case of a design with a bearing in a light frame.

The pivotability of the insulating glass pane through 180° in the case of window and facade constructions of commonly employed types, which may be produced by means of the frameless insulating glazing units in accordance with the invention in an advantageous fashion, endows such constructions with improved quality. If an insulating glazing unit is fitted with a pane predominantly absorbing in the long wavelength range of solar radiation and on its surface facing the intermediate space between the panes with a low emission coating, a so-called "low E coating", the insulating glazing unit, together with the absorption pane, which in summer is turned facing solar radiation, will act as an effective sun shading glass with a reduction of the solar transmission coefficient of up to 40%. In the winter setting on the contrary, in which the absorption pane is turned through 180° to be positioned on the room side, this element will constitute a highly efficient solar collector, which will supply the solar radiation practically without loss and directly to the room as warmth.

Figure 16:
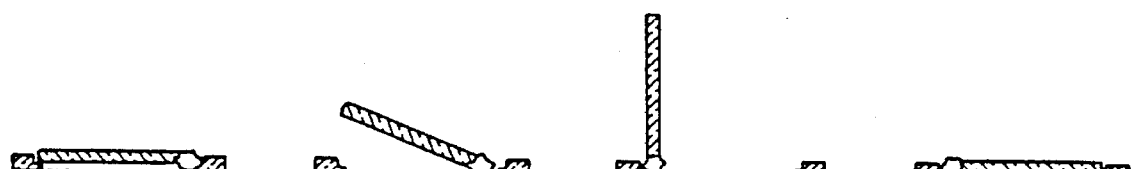
FIG. 16 shows diagrammatic elevations of the positions of a further rotary window.

The ability to be pivoted of window lights through 180° may in a known manner be ensured by means of another mechanical principle, that is to say by pivoting the light while at the same time moving the edge axis pins and the abutment thereof from one side of the outer stationary frame to the other side. This principle is illustrated in FIG. 16 with reference to various positions of the window light. The window light is guided by means of pins of the edge axes with reference to corresponding moulding rails attached in the upper and lower frame groove. A mechanically advantageous design is in this case preferably to have a guide for the window light using rotating gear wheels, which fit into corresponding moulding rails attached in the outer stationary frame groove.

Owing to the tilting moments occurring a mechanically perfect guiding of the window light is only possible in the guide rails if the rotation of the gear wheels takes place synchronously, that is to say if the gear wheels are ganged on a rigid shaft.

In order to produce such a design the invention consequently suggests the arrangement of a tube of torsionally rigid material as a bearing means for the shaft rigidly connecting the gear wheels and the use of such tube inside the glass pane as a frame rail supporting and stiffening the glass body. The integration of such a tube body in the glass body has already been described in connection with the abutment mechanism of the windows of conventional design with reference to FIG. 6.

Figure 17:
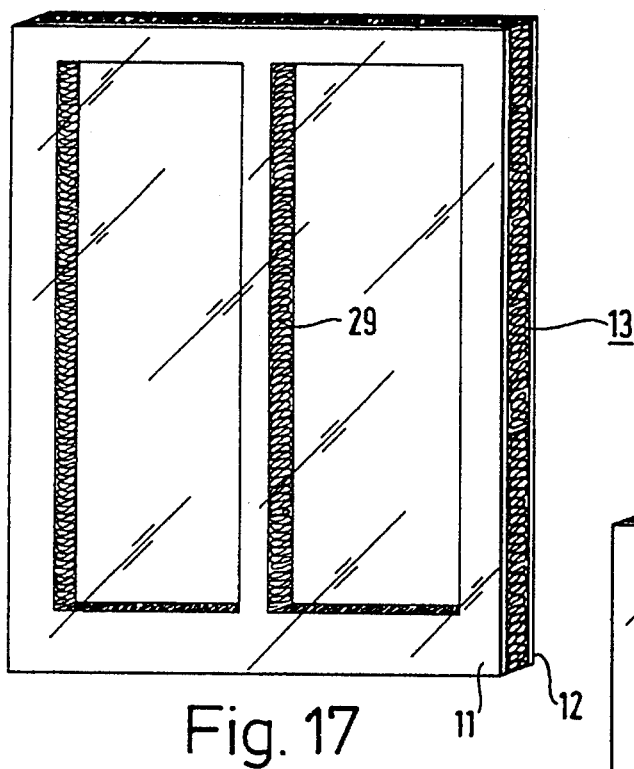
FIG. 17 to FIG. 19 show diagrammatic elevations of further embodiments of shaped bodies in accordance with the invention.

A torsionally rigid tube receiving the shaft may in a statically advantageous fashion also mount the rotary shaft of frameless window lights able to be pivoted past the middle axis. The tube is in this case embedded centrally in a spacer band to be arranged in the pane element. FIG. 17 shows diagrammatically a shaped body with a peripherally extending, surrounding spacer fabric 13, which additionally possesses a spacer band 29, which extends along a middle axis of the panes. Such a spacer band 29 centrally introduced between the panes additionally, attached in a force transmitting manner with the panes 11 and 12 and covered as a rung may be more particularly strengthen insulating glass panes of large area to prevent displacement out of their plane.

Figure 18:
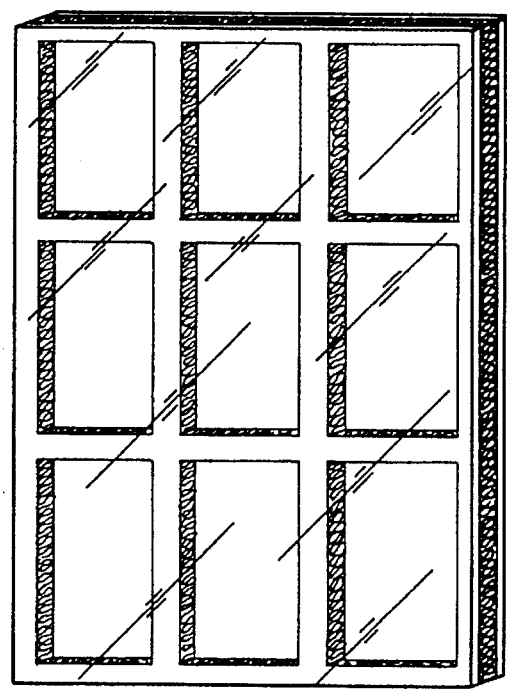

The invention generally proposes so designing insulating glass windows with muntin grids laid in the intermediate spaces between the panes and having muntins so distributed over the extent of the panes that such lattices are constituted by bands of the spacer fabrics 13 in an advantageous manner. A shaped body suitable for such designs is illustrated in FIG. 18. Accordingly there is not only a higher strength and flexural stiffness of the glass element but furthermore, owing to the open structure of the spacer fabrics, as compared with a design using opaque rails, a greater transmission of light and reduced thermal transition.

Figure 19:
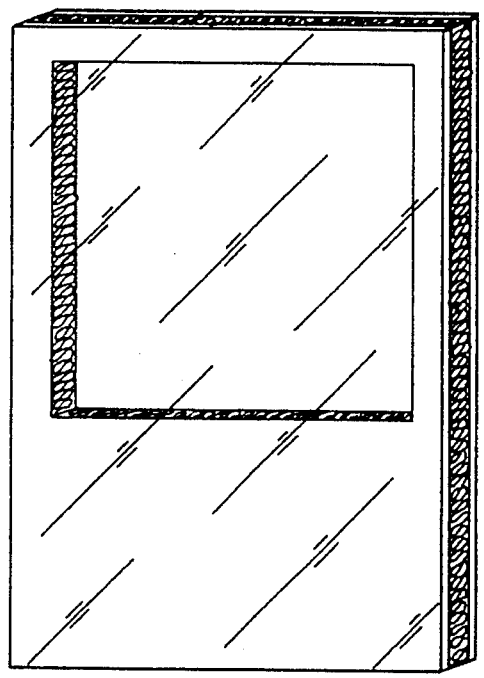

In the case of a window light having the height of a storey of a building it is possible, in order to increase the strength of the glass element in accordance with FIG. 19, for the lower part of the light to be designed in the form of a parapet element provided with a solid frame. It is an advantage if the marginally surrounding shaped body is designed to be wider in the regions of the lower and/or upper pane edge than it is in the lateral regions.

In the case of the embodiment depicted in FIG. 10 by means of surrounding spacer bands 13 three panes 11, 11a and 12 are joined together as a self-supporting, stable sheet member. The edge seal may, as described supra already, be obtained by means of sealing ribs 17 and 19. The design of the edge attachment using spacer fabric bands between the respective panes is more particularly suitable for the manufacture of multi-layer sheet members. In the case of the embodiment illustrated in FIG. 11 the possibility is taken advantage of that instead of one additional pane a plastic sheet or a plastic film 30 may be arranged between the two panes 11 and 12 in order in this manner to use the thermal advantages of a three-pane insulating glazing unit with only a slight increase in weight. The plastic film 30 is in this case connected with the panes by means of two opposite covering layers of the textile spacer fabrics, which constitute the shaped body, in a force transmitting manner.

From the point view of process technology in this case the first stage is to apply a layer of the spacer fabric to one of the panes around the edge. There then follows a bonding attachment of the film on this surrounding fabric band. On the edge part of the film a second fabric band is applied with a bonding action in order to receive the covering pane.

Figure 13:
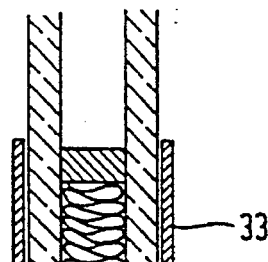
Figure 14:
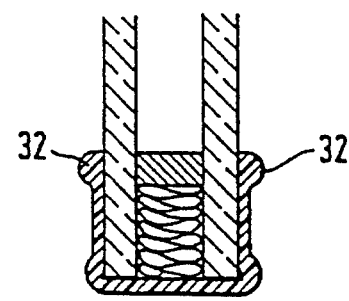

Furthermore it is possible, for reasons of having a pleasing design, to provide the covering panes 11 and 12 with a surrounding, printed on ceramic mask 31 on the inside. Such a design is illustrated in FIG. 12. Such a printed mask at the same time aids a reliable adhesion of the fabric layers 14 and 15 on the panes 11 and 12 and furthermore constitutes a means of UV protection for the adhesive resin coating utilized. The measures depicted in FIGS. 13 and 14 relate to an improved edge protection of the insulating glazing unit and provide an additional seal on the outer stationary frame. On the one hand on both sides surrounding moulding bands 32 or U-like moulding rails 33 of plastic material or thin wood or aluminum material covering both panes are to be applied on the pane element.

On the other hand using rationalized production technology it is possible for such an edge protection or sealing band to consist of a curing synthetic resin, which by means of a shaping nozzle is extruded around the edge onto the pane element in a known manner, the corner connections being then trimmed by pressing.

Figure 14A:
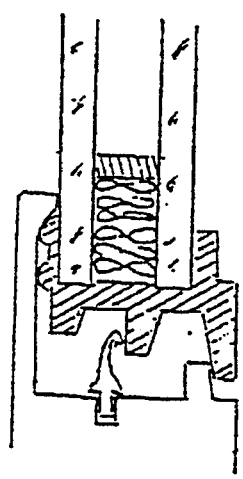

The moulding rails, more particularly in the region of the lower pane edge, can with advantage be adapted to comprise matching shaped parts for the wind and rain shields one or a plurality of which may be arranged in the outer stationary frame, corresponding to the groove dimensions of modern window light frames. An embodiment of that type is illustrated in FIG. 14a. In that case the existing groove dimensions of contemporary outer stationary frames can be retained. Especially when conventional windows are renovated using the window lights in accordance with the invention, a considerable advantage is achieved.

It is naturally possible to utilize toughened or partly toughened glass and composite safety glass and latterly furthermore transparent synthetic resin panes for the panes 10 and 12 of the insulating glazing element in addition to conventional float glass. In the case of a design of the element with absorbing colored glass or with glass, which is provided with absorbing coatings, it is recommended to preferably utilize toughened or partly toughened glass.

I claim:

1. An insulating glazing unit comprising at least two panes arranged in parallelism to each other and connected together by a marginally surrounding spacer, characterized in that the spacer is constituted by a shaped body which possesses a plurality of elastic, flexurally rigid and mutually intersecting filaments, which extend transverse in relation to the plane of the panes and form a force transmitting buttressing means between the panes.

2. The insulating glazing unit as claimed in claim 1, characterized in that at least in a substantial portion of the mutually intersecting filaments such filaments are connected with each other.

3. The insulating glazing unit as claimed in claim 1 or in claim 2, characterized in that the filaments are arranged with a density of approximately 10 to 60 filaments per square centimeter.

4. The insulating glazing unit as claimed in claim 1, characterized in that the shaped body is constituted by a textile spacer fabric, which is made up of at least two covering layers and rib fibers constituting the filaments, the rib fibers being erected and stiffened by impregnation with resin.

5. The insulating glazing unit as claimed in claim 4, characterized in that the said resin is selected from the group essentially including epoxy, polyurethane, phenol and polyester resins and mixtures thereof.

6. The insulating glazing unit as claimed in claim 1 characterized in that the shaped body is made up of glass, synthetic resin or carbon fibers or mixtures thereof.

7. The insulating glazing unit as claimed in claim 6, characterized in that the shaped body is constituted by glass fibers, which are provided with silane sizes.

8. The insulating glazing unit as claimed in claim 6 or in claim 7, characterized in that the glass, synthetic resin or carbon fibers are constituted at least partly of hollow fibers.

9. The insulating glazing unit as claimed in claim 1, characterized in that the filaments are provided with resins sizes of graduated density, which endow them with the property of a low loss light guide.

10. The insulating glazing unit as claimed in claim 1, characterized in that the filaments have a mean degree of fineness of 20 to 80 tex.

11. The insulating glazing unit as claimed in claim 1, characterized in that the spacer is surrounded on the outside by a sealing rib arranged between the panes.

12. The insulating glazing unit as claimed in claim 11, characterized in that between the panes a further sealing rib is arranged on the inside on the spacer.

13. The insulating glazing unit as claimed in claim 1, characterized in that the filaments are arranged with a density increasing towards the edge and the intermediate space between the panes is sealed to the outside against the resin layer applied to the filaments.

14. The insulating glazing unit as claimed in claim 1, characterized in that the shaped body is attached to the panes by means of transparent adhesive films.

15. The insulating glazing unit as claimed in claim 1, characterized in that the shaped body is designed with a T-like cross section, the web of the T-like shaped body being arranged between the pane and the flanges of the T-like shaped body overlapping the outer edges of the panes.

16. The insulating glazing unit as claimed in claim 1, characterized by the use thereof as a frameless window, wall, roof, door or parapet element.

17. The insulating glazing unit as claimed in claim 1, characterized in that at least one tubular body is embedded in a force transmitting fashion in at least one section of the shaped body and extending in the longitudinal direction thereof.

18. The insulating glazing unit as claimed in claim 17, characterized in that the tubular body receives for at least a part of its length a rod as a pivot shaft, which extends past the ends of the tubular body.

19. The insulating glazing unit as claimed in claim 1, characterized in that at least one hollow moulding band is embedded in a force transmitting fashion in at least one section of the shaped body so as to extend in the longitudinal direction thereof.

20. The insulating glazing unit as claimed in claim 1, characterized in that the panes, in addition to their force transmitting connection by means of the shaped body are coupled in a force transmitting manner in the edge part by screw or rivet means.

21. The insulating glazing unit as claimed in claim 1, characterized in that the panes, in addition to their force transmitting connection by means of the shaped body are coupled in a force transmitting manner by means of an adhesive composition in a cured state introduced while viscous into non-circular through holes in the panes.

22. The insulating glazing unit as claimed in claim 1, characterized in that the insulating glazing unit is able to be turned through 180°.

23. The insulating glazing unit as claimed in claim 1, characterized in that the insulating glazing unit is pivotally mounted for tilting about one of the middle axes of the pane surface.

24. The insulating glazing unit as claimed in claim 23, characterized in that at least one bearing element is provided between the panes generally in the middle of the extent of the area of the same transversely in relation to the longitudinal direction of the shaped body.

25. The insulating glazing unit as claimed in claim 1, characterized in that in the intermediate space between the panes and generally in the middle of the extent of the area of the same a space band is arranged constituted by the shaped body and which connects the panes in a force transmitting fashion and extends along at least one of the middle axes of the panes.

26. The insulating glazing unit as claimed in claim 25, characterized in that at least one tubular body is embedded in a force transmitting fashion in at least one section of the spacer band and extends in the longitudinal direction thereof.

27. The insulating glazing unit as claimed in claim 1, characterized in that in the intermediate space between the panes a muntin grid is arranged with glazing bars extending over the area of the panes, such bars respectively being constituted by a shaped body.

28. The insulating glazing unit as claimed in claim 1, characterized in that at least three panes are connected to constitute a single pane body by means of a surrounding shaped body arranged at the edge.

29. The insulating glazing unit as claimed in claim 1, characterized in that between the panes a plastic sheet or plastic film is arranged, which by means of two oppositely arranged shaped bodies is connected in a compound manner with the panes to have a force transmitting connection therebetween.

30. The insulating glazing unit as claimed in claim 1, characterized in that the lower and/or upper regions of the marginally surrounding shaped body are wider than the lateral regions thereof.

31. The insulating glazing unit as claimed in claim 1, characterized in that the panes are provided on the inside with a surrounding printed on ceramic mask arranged at the edge.

32. The insulating glazing unit as claimed in claim 1, characterized in that at the edge surrounding moulding bands with an U-like cross section of plastic, wood or aluminum are provided which are applied to the panes on the outside.

33. The insulating glazing unit as claimed in claim 32, characterized in that the moulding bands comprise matching shaped parts for rain and wind shields disposed in the outer stationary frame at least in the region of the lower pane edge.

34. The insulating glazing unit as claimed in claim 1, characterized in that at least one of the panes consists of toughened or partly toughened glass, composite safety glass or transparent plastic.

35. The insulating glazing unit as claimed in claim 1, characterized in that one of the panes is provided to be radiation absorbent.

36. The insulating glazing unit as claimed in claim 35, characterized in that at least the pane provided to be radiation absorbent has a low E coating on the surface thereof facing the intermediate space between the panes.

37. A method for the production of a frameless insulating glazing unit, characterized in that in a surrounding manner on the edge of a pane a resin impregnated spacer fabric comprising at least two oppositely arranged covering layers and, perpendicularly to the extent of the area of the covering layers, rib fibers is laid, the second pane is laid on with an accurate fit and the resulting laminate is compressed with an accurate fit in a pressing mold so that the panes are bondingly connected with the covering layers of the fabric with a surrounding arrangement and at the edge, whereafter the pressing mold is opened, the rib fibers erect themselves and the resin is cured.

38. The method as claimed in claim 37, characterized in that the pressing mold is opened a graduated amount until the desired distance between the panes is reached.

39. A method for the production of a frameless insulating glazing unit, characterized in that a textile spacer fabric comprises at least two mutually opposite covering layers and rib fibers extending transversely in relation to the extent of the area of the covering layers and is impregnated with resin and such resin cured and in that from such spacer fabric after curing shaped bodies are produced in a form ready for assembly, which are then connected together at the edge and in a surrounding manner and in a manner defining a distance apart are arranged between the at least two panes and are connected in a bonding manner with the panes.

40. The method as claimed in claim 39, characterized in that after the impregnation and prior to their final curing the shaped bodies pass through a shaping tool in a continuous process.

41. The method as claimed in claim 39 or in claim 40, characterized in that concurrently in one single operation the shaped bodies are provided with an adhesive coating on at least one covering layer of the spacer fabric and with an adhesive sealing rib on at least one of the side surfaces.

* * * * *